(12) United States Patent
Robinson

(10) Patent No.: US 10,667,532 B2
(45) Date of Patent: Jun. 2, 2020

(54) CHICKEN WING CUTTER AND FRYER

(71) Applicant: Mamie Robinson, Chicago, IL (US)

(72) Inventor: Mamie Robinson, Chicago, IL (US)

(73) Assignee: Mamie Powell, Chicago, IL (US)

( * ) Notice: Subject to any disclaimer, the term of this patent is extended or adjusted under 35 U.S.C. 154(b) by 91 days.

(21) Appl. No.: 15/932,471

(22) Filed: Mar. 5, 2018

(65) Prior Publication Data

US 2018/0317506 A1  Nov. 8, 2018

Related U.S. Application Data

(63) Continuation-in-part of application No. 14/998,885, filed on Feb. 29, 2016, now abandoned.

(51) Int. Cl.
*A22C 21/00*  (2006.01)
*A47J 37/12*  (2006.01)

(52) U.S. Cl.
CPC ...... *A22C 21/0023* (2013.01); *A22C 21/0046* (2013.01); *A47J 37/128* (2013.01); *A47J 37/129* (2013.01)

(58) Field of Classification Search
CPC ............. A22C 21/0023; A22C 21/0046; A47J 37/128; A47J 37/129; A22B 5/0029; A22B 5/0047
See application file for complete search history.

(56) References Cited

U.S. PATENT DOCUMENTS

| | | | | |
|---|---|---|---|---|
| 4,930,187 A | * | 6/1990 | Whittington | A22C 21/0023 452/170 |
| 5,289,760 A | * | 3/1994 | Barradas | A47J 37/12 241/282.2 |
| 2016/0302620 A1 | * | 10/2016 | Repac | A47J 43/25 |

FOREIGN PATENT DOCUMENTS

JP  2010252764 A  * 11/2010

* cited by examiner

*Primary Examiner* — Daniel J Colilla

(57) ABSTRACT

A chicken wing cutter is provides a safe and sanitary way to cut chicken wings and fry them. The chicken wings cutter is a device that holds chicken wings in place and cut them without having to use a knife. It provides safety measure to cut chicken wings without the use of knives or machinery having to hold and touch the chicken. This will avoid contamination or carrying of such bacteria caused while handling poultry and avoid spills from frying. The device allows you to place the chicken in the cradles. Once secure in the cradles, the chicken cutter cut the chicken in precise pieces in preparation for cooking chicken wings in a fryer. The device has blades within the lid that retracts and closed and oval locked is secure the chicken is ready to cut then after placed on cradle for frying.

4 Claims, 5 Drawing Sheets

CHICKEN WING CUTTER AND FRYER

SUMMARY OF INVENTION

The disclosed invention is directed to a chicken wing cutter and fryer. It was created by me to assist in preparing chicken wings for my family. It was designed to help me when cutting chicken wings to avoid accidents in the kitchen while preparing hot wings for my family. The chicken wing cutter is a device that cuts the wings in to pieces by placing the wings in a cradle in the device. This device cuts the wings precisely and cleanly. This allows one to perfectly cut chicken wings and cook them all in one process. Many restaurants use large machinery and knives to cuts wings and then place them in a fryer. This device will eliminate any danger to one's self while cutting chicken wings and will avoid the necessity of purchasing expensive machinery to cut chicken wings. This device also has safety measures when frying to avoid oil spills and burning allowing one to safely cook around children when cooking with hot oils and grease. This device also frees one from touching the chicken thereby avoiding contamination and contact with bacteria from handling poultry. Additionally, the device has a secure lock for safety while frying.

The chicken wing cutter and fryer may be provided in many colors, it may be square or oval in shape, and it may cut ten chicken wings at a time. The device has a digital face and timer for cooking. The chicken wings are placed in the cradle, which has a section for each individual chicken wing, ten at time. The device has a lid that has an oval shape lock that, once secured, locks the lid in a closed configuration and cuts the chicken wings into pieces.

How to use the appliance: Place the chicken wings in the individual sections of the cradle device. Close the lid, once it's closed-and secured with the oval shape button, the blades are released and will cut the chicken wings into pieces. After cutting, the cradle that holds the chicken wings is placed into a fryer, a timer is set for the time to cook the chicken wings. The chicken wings will have increased from 10 pieces of chicken to 20 pieces of chicken once the process is complete and without any grease spills, burns or injuries.

DETAILED DESCRIPTION OF THE INVENTION

Figure 1:
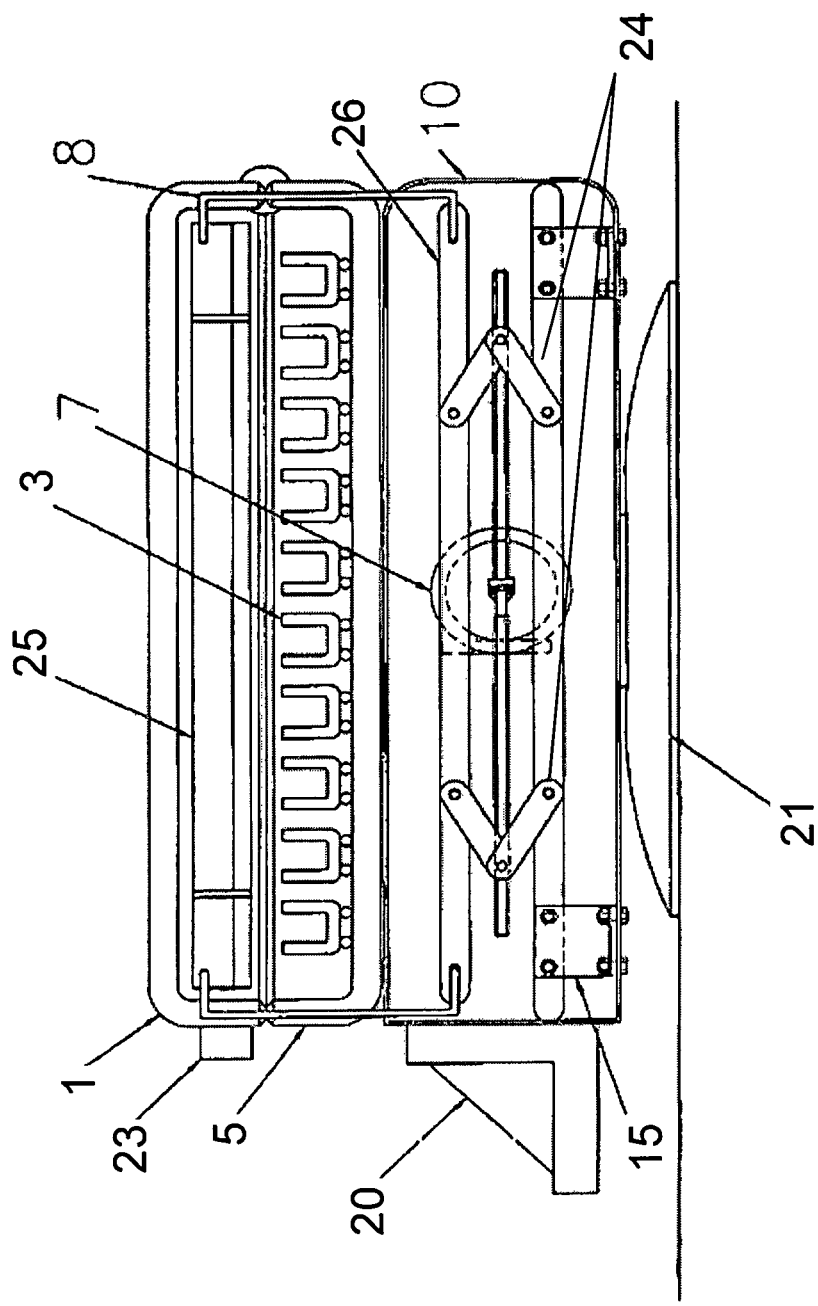
FIG. 1 is a cross-sectional, side view of the appliance.
Figure 3:
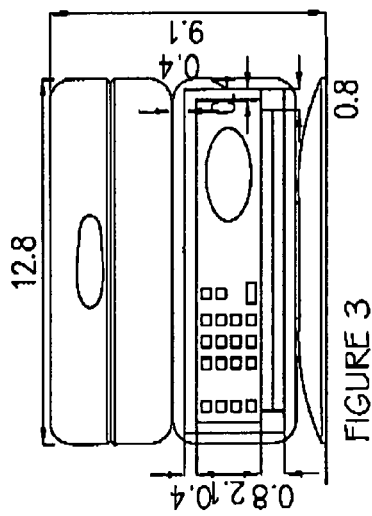
FIG. 3 is a front view of the appliance including a digital array of certain settings along with oval selections of choice for temperature, and a space for a symbol.
Figure 4:
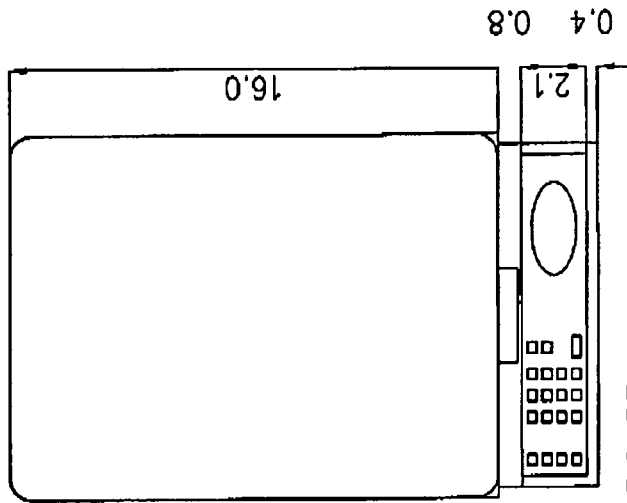
FIG. 4 is a top view of the appliance.
Figure 2:
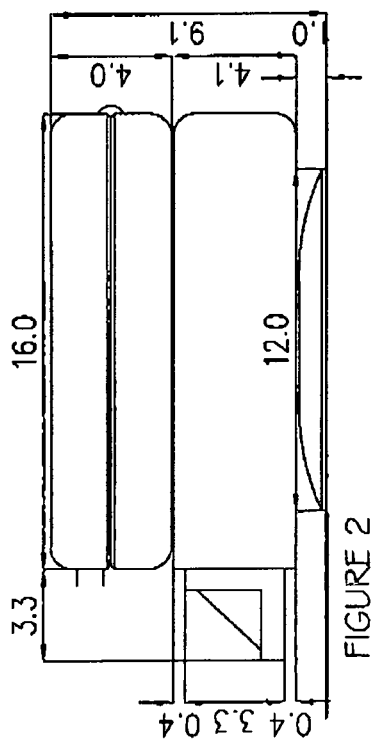
FIG. 2 is a side view of the appliance.
Figure 5:
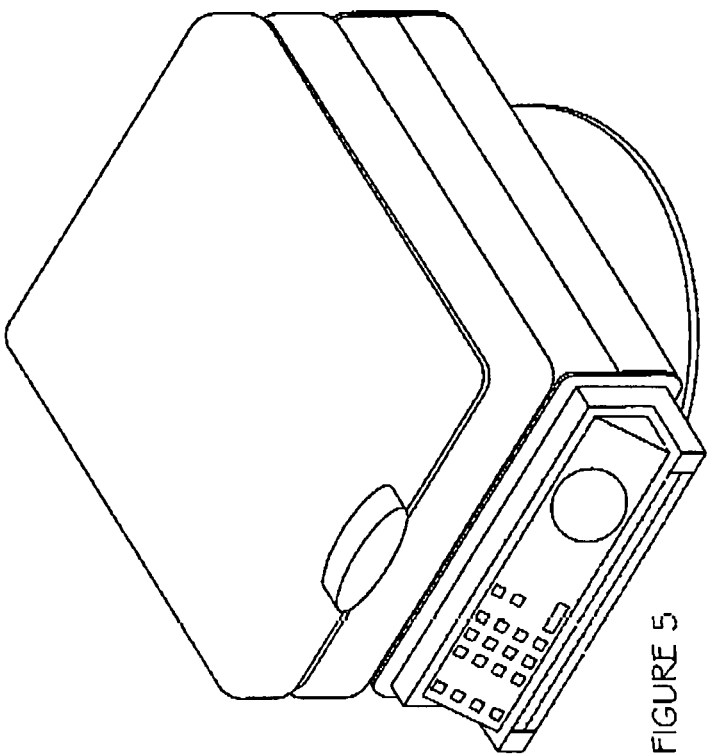
FIG. 5 is a perspective view of the appliance.
Figure 6:
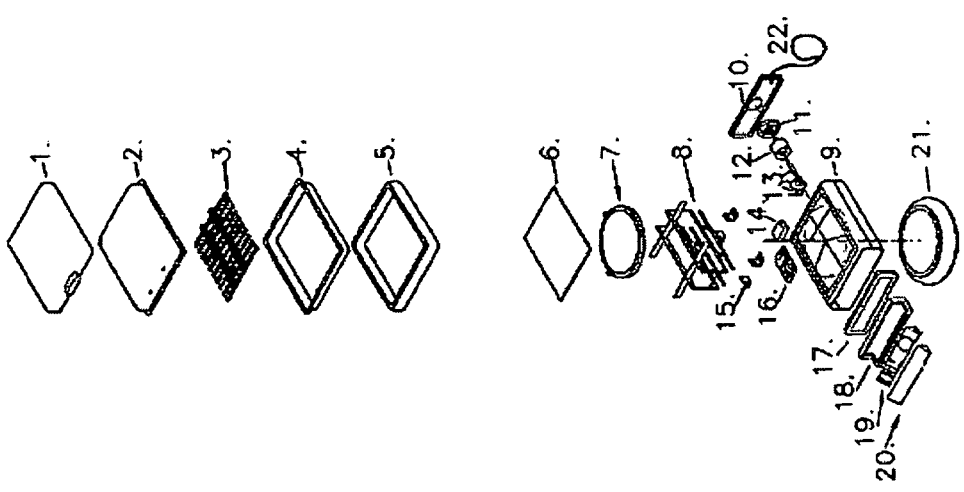
FIG. 6 is an exploded view of the appliance.
Figure 7:
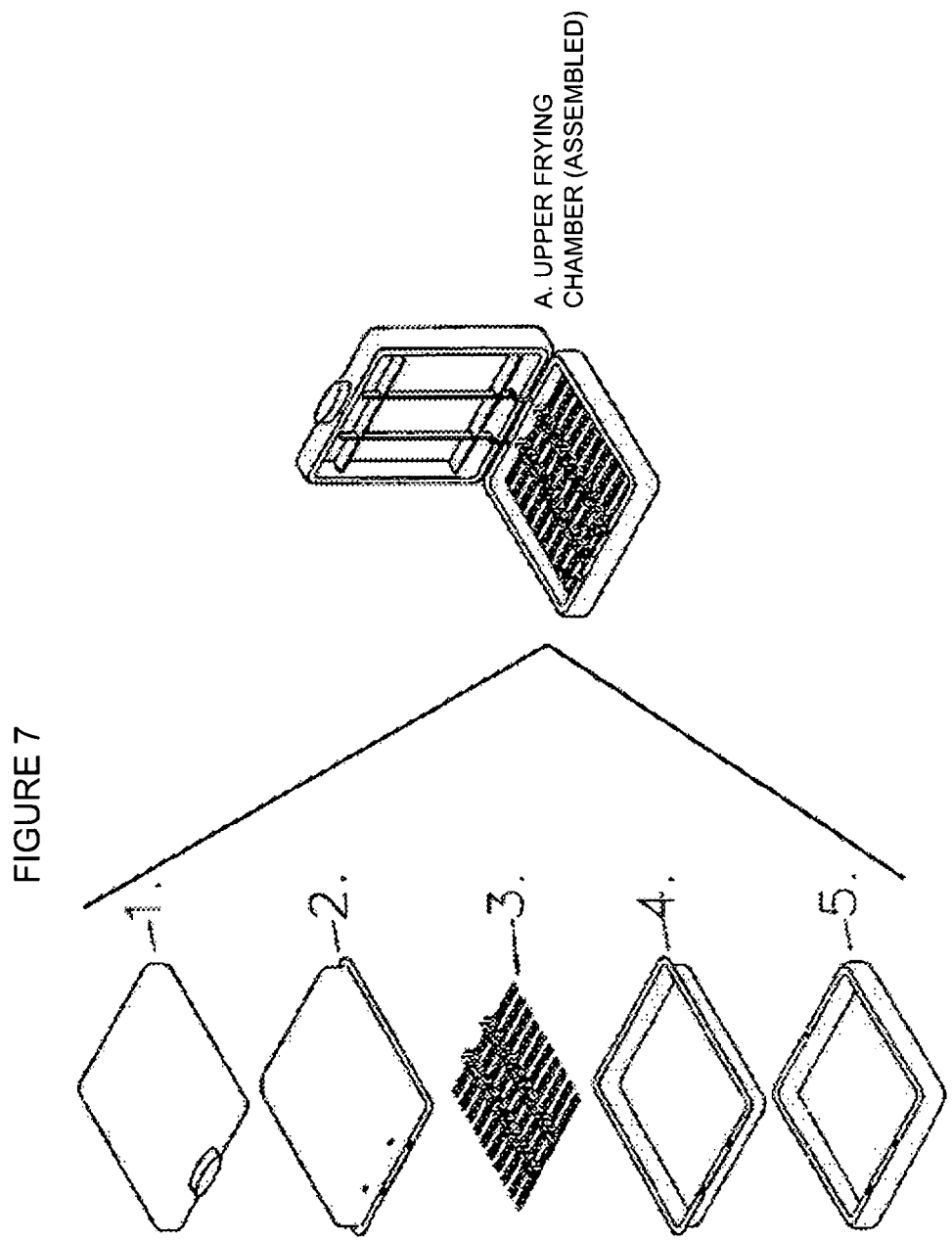
FIG. 7 is a magnified, exploded view of a top portion of the appliance.
Figure 8:
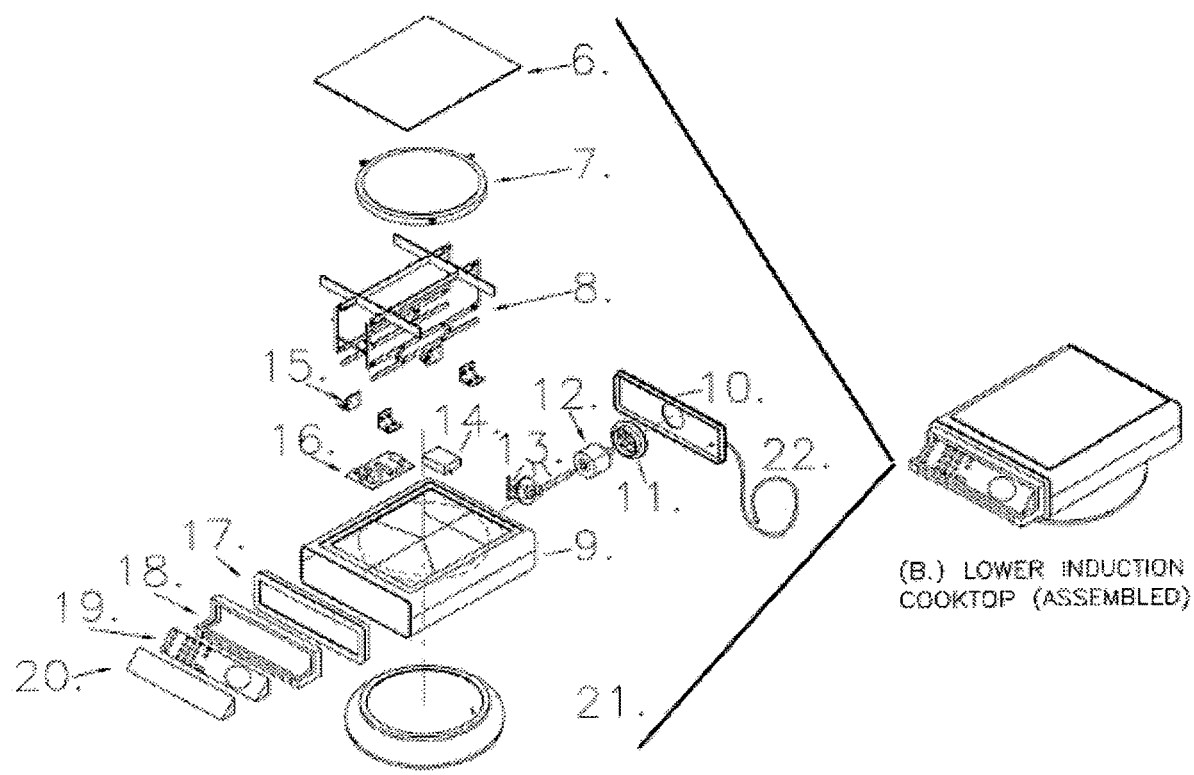
FIG. 8 is a magnified, exploded view of a bottom portion of the appliance.

The chicken wing cutter and fryer is primarily composed of two parts, part A is the upper part and part B is the lower part. Part A has a top lid 1 and bottom lid 5 each constructed of cast aluminum and lined with ceramic. Part B is a pan portion and has a stainless steel cladding to the bottom. The insides that go into the top and bottom lids are steel that is ceramic coated. The insides are comprised of the cutting mechanism and cradle 3 that holds the chicken wings in place. The joint of each chicken wing will be placed approximately where the joints meet and the blades that will come down and cut the joint of each chicken wing by pressing the chicken wing joints against the cradle. Once the lid is closed and an oval safety button 23 is engaged the two blades 25 of the cutter mechanism in the top lid 1 will descend on 10 chicken wings in the cradle 3, cutting at the joints to cleanly cut the chicken wings. FIG. 7 shows that upper liner 2 inserts into the top lid 1 and lower liner 4 inserts into the bottom lid 5. Both the upper and lower liners are made of stainless steel that is coated with ceramic. On the inside the cutting mechanism will project the blades 25 from the top liner 2 as soon as top lid 1 is closed and oval button 23 is engaged. The levers 24 will be brought into connection with the blades 25 and lock them there for safety reasons. The lock is the oval shape button 23 and is located on the top lid. The cradle 3 have ceramic handles to avoid burning when they are placed in the bottom of the fryer. The apparatus can be dissembled for easy cleaning.

On the oval button 23, there is a small celluloid that engages the two levers 24 into the blades 25. The blades 25 are carbon serrated blades. Once the oval button 23 is depressed, the celluloid 26 engages two levers that engage into the knives and lock them into place upon which, the compound levers 24 (connected with the reduction motor and gear to reduce the RPM) cause the blades 25 to engage the joints with maximum torque.

Part A is an upper portion including the top lid 1 and the bottom lid 5 and is where the cutting and frying of the chicken wings occurs and where the serrated blades 25 and the cradle 3 are located.

Part B is the base housing the electric motor 12, reduction gear 13, fan, air extractor, and microprocessor.

1 is the top lid.
2 is the top liner that goes inside top lid 1.
3 is the chicken wings cradle that holds 10 pieces of chicken and cuts 20 joints of chicken.
4 is the bottom liner that goes inside bottom lid 5.
5 is the bottom lid.
6 is a handle clad in heat resistant material.
7 are the induction coils that create magnetic heat for the upper part.
8 is a pair of celluloid connectors 26 that are each engaged with a pair of two levers 24 and the blades 25 once button 23 is depressed. The celluloid acts as an on and off switch, that pushes away the hook levers that are engaged in front of blades 25. Upon or as soon as device senses cooking activities are finished, the oval safety button 23 is released to allow one to lift lid 1 and remove the contents of the appliance. Blades 25 in the upper lid 1 are connected with a celluloid having an on and off position which engages with the blades 25. The celluloid is connected with the reduction motor and gear to reduce rpm to engage maximum torque and thereby cut 20 joints.
9 is a housing portion of part B.
10 is a back plate of the housing portion 9.
11 is an electric fan for cooling the induction area that is located in lower part B. The electric fan 11 is also used for pushing out the air from base 21 creating a suction in the base 21 thereby preventing the apparatus from moving on a counter.
12 is an electric motor, for example, an induction motor, a throw out barren and another celluloid for engaging a series of reduction gears, to allow the cutting device to descend on the chicken wings.

13 is a reduction gear for controlling the action of the compound levers 24 and reduce RPM of the motor 14 is the air extractor for the base.

15 are the brackets that fasten to the bottom half of part B to hold down the cutting mechanism.

16 is a microprocessor that controls the apparatus to create different conditions for various chicken cooking recipes.

17 is a front face plate for housing 9, similar to back plate 10. Front face plate is molded from plastic.

18 is an area where additional microprocessors and key pads are located.

19 is an interface including a touch screen with a digital array of certain settings including selections for temperature. The interface may also include a space for a trademark symbol.

20 is a plastic covering that protects the touch screen thereby allowing for easy cleaning and for protecting the touch screen from damage.

21 is the base for part B of the appliance and is a suction base to hold the device in place thereby preventing the appliance from moving.

22 is a power cord for the apparatus.

23 is the oval shaped button.

24 are four pairs of levers connected to the cutting mechanism.

25 are the cutting blades of the cutting mechanism.

26 is the small celluloid connecting the pairs of levers 24.

The invention claimed is:

1. A device for cutting chicken wings into separate pieces comprising:

an upper section including a top lid and a bottom lid each constructed from cast aluminum and lined with a ceramic lining;

an inner lining in each of the top lid and bottom lid comprising ceramic coated steel;

a cradle located below the top lid configured to position and hold a plurality of chicken wings in place while the chicken wings are being cut, wherein the chicken wings each include a joint;

a cutting mechanism including blades disposed in the inner lining of the top lid and configured to cut the joint of each of the plurality of chicken wings;

a lower section comprising a stainless steel pan portion, wherein the device is configured so that when the top lid is closed, the blades are caused to project out from the top lid and engage with the chicken wings, thereby cutting each of the chicken wings.

2. The device for cutting chicken wings into separate pieces according to claim 1, further comprising:

a lower section positioned below the upper section, wherein the lower section includes a heating device configure to provide heat to the lower lid for frying the chicken wings located in the cradle.

3. The device for cutting chicken wings into separate pieces according to claim 2, wherein the heating device is an induction heating device.

4. A method of cutting chicken wings into separate pieces with an apparatus comprising the steps of:

placing a plurality of chicken wings into a cradle configured to hold the plurality of chicken wings, wherein the cradle is located within the apparatus, and wherein each of the chicken wings in the plurality of chicken wings includes a joint;

closing a top lid of the apparatus causing a plurality of blades to project from underneath the top lid and engage with the plurality of chicken wings, whereby each joint of the chicken wings of the plurality of chicken wings is cut into two pieces, wherein the cut pieces of chicken wings drop further into the cradle for frying; and opening the top lid of the apparatus causing the blades to retract into the top lid.

\* \* \* \* \*